United States Patent
Deshpande et al.

(10) Patent No.: US 10,691,648 B2
(45) Date of Patent: Jun. 23, 2020

(54) CONTROLLING VOLATILITY VIA BLOCKCHAIN

(71) Applicant: International Business Machines Corporation, Armonk, NY (US)

(72) Inventors: Pralhad Dinesh Deshpande, Singapore (SG); Muhammad Tayyab Asif, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 16/026,943

(22) Filed: Jul. 3, 2018

(65) Prior Publication Data
US 2020/0012731 A1    Jan. 9, 2020

(51) Int. Cl.
| | | |
|---|---|---|
| G06F 16/182 | (2019.01) | |
| H04L 9/06 | (2006.01) | |
| G06Q 20/40 | (2012.01) | |
| G06F 16/27 | (2019.01) | |

(52) U.S. Cl.
CPC .......... *G06F 16/1834* (2019.01); *G06F 16/27* (2019.01); *G06Q 20/40* (2013.01); *H04L 9/0643* (2013.01); *H04L 2209/38* (2013.01); *H04L 2209/56* (2013.01)

(58) Field of Classification Search
CPC .................................................. G06F 16/1834
See application file for complete search history.

(56) References Cited

U.S. PATENT DOCUMENTS

| | | | |
|---|---|---|---|
| 2010/0100500 A1* | 4/2010 | Nunes | G06Q 40/04 705/36 R |
| 2017/0187535 A1 | 6/2017 | Middleton et al. | |
| 2017/0249606 A1 | 8/2017 | Pirooz | |
| 2017/0310747 A1 | 10/2017 | Cohn et al. | |
| 2017/0323392 A1* | 11/2017 | Kasper | G06Q 40/12 |
| 2019/0012662 A1* | 1/2019 | Krellenstein | H04L 9/0637 |
| 2019/0190719 A1* | 6/2019 | van de Ruit | G06F 21/64 |
| 2019/0332691 A1* | 10/2019 | Beadles | H04L 9/0825 |

OTHER PUBLICATIONS

Gatteschi et al., To Blockchain or Not to Blockchain: That Is the Question, IEEE Computer Society, all pages. (Year: 2018).*
Cermak, "Can Bitcoin Become a Viable Alternative to Fiat Currencies? An empirical analysis of Bitcoin's volatilitybased on a GARCH model" Skidmore College, Saratoga Springs, NY 2017 (Background).

(Continued)

*Primary Examiner* — Jacob C Coppola

(57) ABSTRACT

An example operation may include one or more of receiving cryptocurrency information of a cryptocurrency mined via a blockchain, determining a volatility of the cryptocurrency based on the received cryptocurrency information, in response to the determined volatility being greater than a predetermined threshold, stopping inclusion of transaction data within data blocks for storage on the blockchain, and generating one or more transaction-free data blocks, and storing the one or more transaction-free data blocks within a hash-linked chain of transaction data blocks previously stored on the blockchain.

20 Claims, 10 Drawing Sheets

(56) References Cited

OTHER PUBLICATIONS

Douget, "The Nature of the Form: Legal and Regulatory Issues Surrounding the Bitcoin Digital Currency System" Louisiana Law Review vol. 73 | No. 4 Summer 2013 (Background).
Lu, "Impact of Margin Trading on Chinese Bitcoin Market and Its Recent Reform" Honors thesis, NYU Shanghai 2017 (Related).
Magnuson, Regulating Fintech (Aug. 26, 2017). Vanderbilt Law Review, Forthcoming; Texas A&M University School of Law Legal Studies Research Paper No. 17-55. Available at SSRN: https://ssm.com/abstract=3027525 (Related).
Wildau, "Major chinese bitcoin exchanges halt withdrawals after crackdown," available from https://www.ft.com/content/415bf86c-ef67-11e6-930f-061b01e23655 2017 (Background).

* cited by examiner

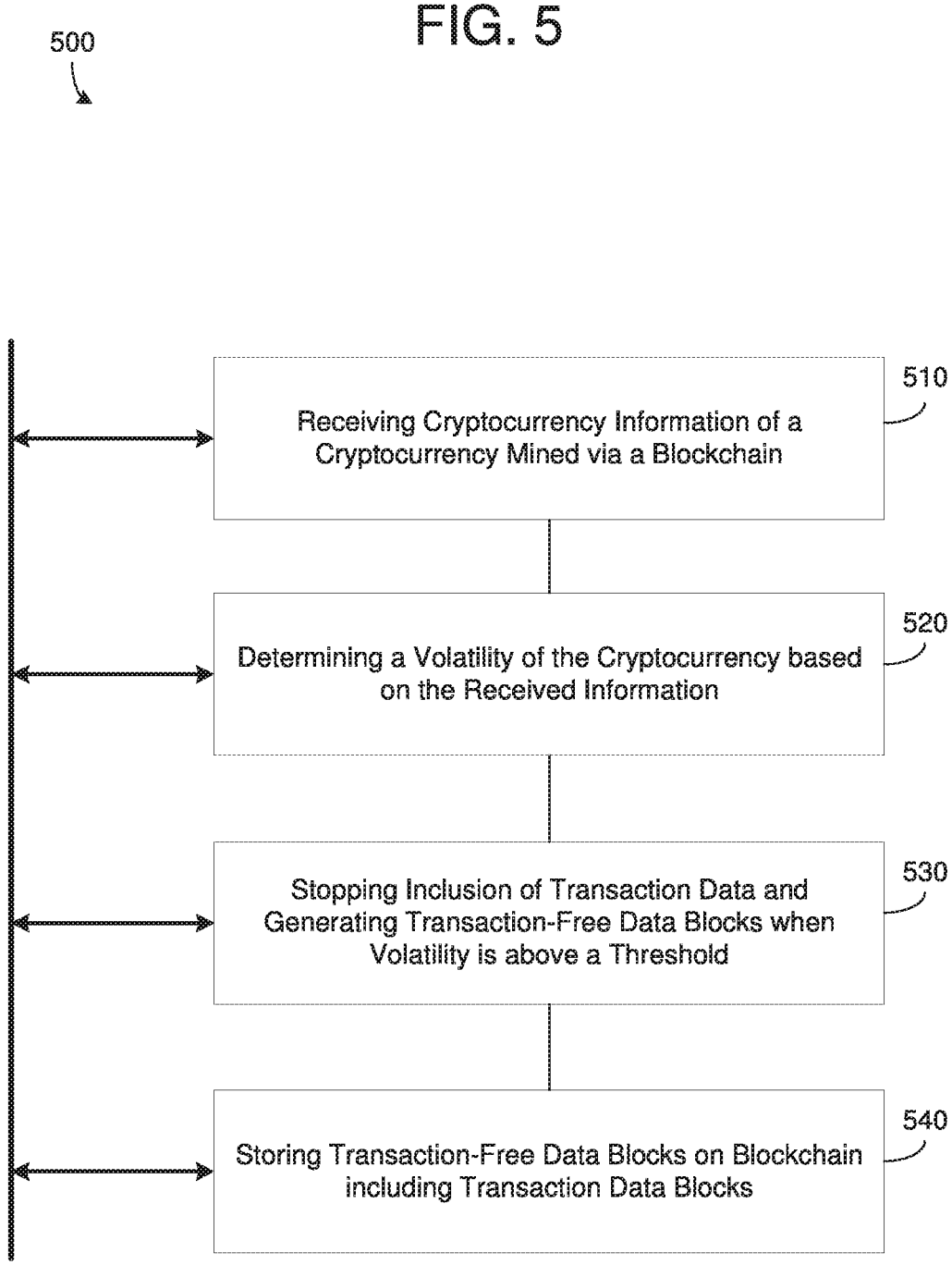

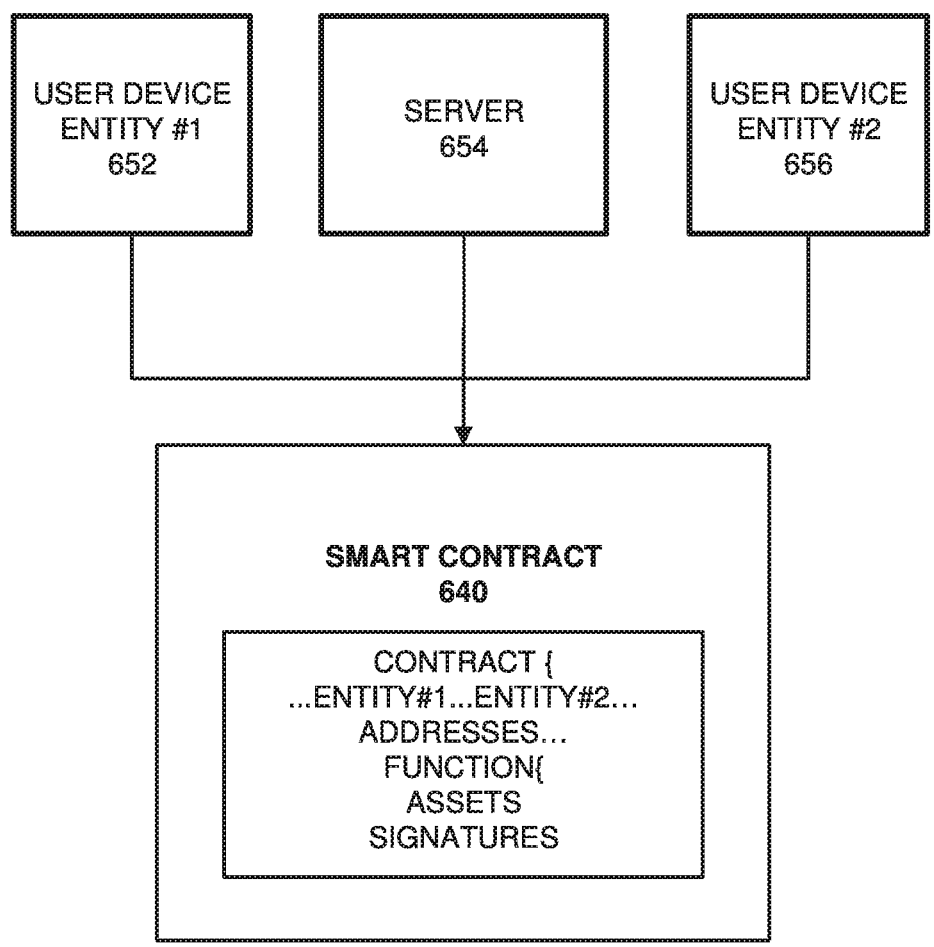

CONTROLLING VOLATILITY VIA BLOCKCHAIN

TECHNICAL FIELD

This application generally relates to a blockchain network, and more particularly, to controlling volatility via blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), and verifiability (all transactions can be cryptographically verified). A blockchain is an example of a CDL. While the description and figures herein are described in terms of a blockchain, the instant application applies equally to any CDL.

To implement the CDL, cryptographic techniques such as storing cryptographic hashes relating to other blocks may be applied. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. The records stored on a blockchain are secured from tampering and revision due to the immutable properties created by the hashed chain. Each block contains a timestamp and a link to a previous block. A blockchain can be used to hold, track, transfer and verify information. Since a blockchain is a distributed system, before adding a transaction to a blockchain's ledger, all peers need to reach a consensus status.

One type of asset that is unique to blockchain is cryptocurrency. Cryptocurrency is a digital currency in which encryption techniques are used to regulate the generation of units of the currency and verify the transfer of funds, operating independently of a central bank. In contrast, a fiat currency is legal tender that is typically backed by a central authority (e.g., government, etc.) Because of this, fiat currency maintains stability in its value allowing for confidence in its use in day-to-day transactions. For example, today's value of a US dollar is going to be very close to tomorrow's value. In contrast, cryptocurrency has very little stability due to the lack of a central authority. However, decentralization is critical to the implementation of blockchain. Accordingly, what is needed is a mechanism that can stabilize cryptocurrency value without relying on a central authority.

SUMMARY

One example embodiment may provide a method that includes one or more of receiving cryptocurrency information of a cryptocurrency mined via a blockchain, determining a volatility of the cryptocurrency based on the received cryptocurrency information, in response to the determined volatility being greater than a predetermined threshold, stopping inclusion of transaction data within data blocks for storage on the blockchain, and generating one or more transaction-free data blocks, and storing the one or more transaction-free data blocks within a hash-linked chain of transaction data blocks previously stored on the blockchain.

Another example embodiment may provide a system that includes a network interface configured to receive cryptocurrency information of a cryptocurrency mined via a blockchain, a processor configured to perform one or more of determine a volatility of the cryptocurrency based on the received cryptocurrency information, and, when the volatility is determined to be greater than a predetermined threshold, stop inclusion of transaction data within data blocks for storage on the blockchain and generate one or more transaction-free data blocks, and a storage configured to store the one or more transaction-free data blocks within a hash-linked chain of transaction data blocks previously stored on the blockchain.

A further example embodiment may provide a non-transitory computer readable medium comprising instructions, that when read by a processor, cause the processor to perform one or more of receiving cryptocurrency information of a cryptocurrency mined via a blockchain, determining a volatility of the cryptocurrency based on the received cryptocurrency information, in response to the determined volatility being greater than a predetermined threshold, stopping inclusion of transaction data within data blocks for storage on the blockchain, and generating one or more transaction-free data blocks, and storing the one or more transaction-free data blocks within a hash-linked chain of transaction data blocks previously stored on the blockchain.

BRIEF DESCRIPTION OF THE DRAWINGS

FIG. 4B is a diagram illustrating an example of a transaction-free data block according to example embodiments.

FIG. 5 is a diagram illustrating a method of controlling volatility of a cryptocurrency via a blockchain, according to example embodiments.

FIG. 6B is a diagram illustrating a smart contract configuration among contracting parties and a mediating server configured to enforce smart contract terms on a blockchain, according to example embodiments.

DETAILED DESCRIPTION

Figure 1:
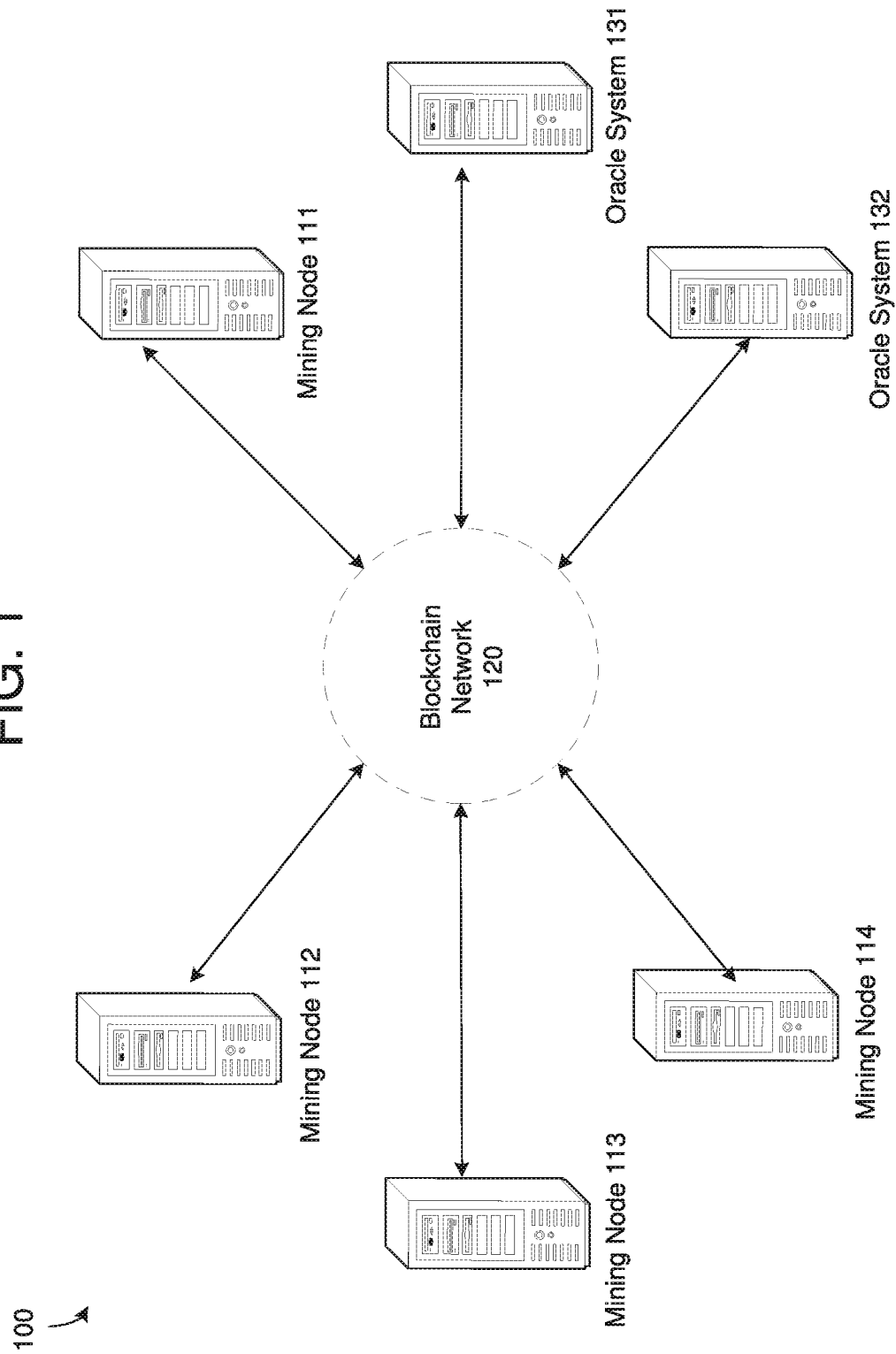
FIG. 1 is a diagram illustrating a blockchain network for controlling volatility of a cryptocurrency, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which are configured to monitor and control volatility of a cryptocurrency through a blockchain network where the cryptocurrency is mined. In various embodiments, the network includes mining nodes that listen for and store transactions. Mining nodes also unearth or otherwise mine new units of value of the cryptocurrency through the execution and solving of complex algorithms. Based on the transactions and a reward for mining new units of value, the mining nodes receive value in the form of cryptocurrency. The network also includes oracles which are determined through consensus by the mining nodes and which provide the mining nodes with volatility information related to the cryptocurrency. When a mining node determines that the volatility of the cryptocurrency has exceeded a predetermined threshold, the mining node may manipulate the blockchain ledger by storing empty data blocks (transaction-free data blocks) and suspend or otherwise stop storing transactions. The suspension may be temporary and may continue for a predetermined number of blocks enabling the volatility to stabilize.

In order for a cryptocurrency to become a reliable electronic payment system, the fluctuation that occurs (which is typically a significant hurdle) in value of the underlying crypto-currency needs to be stabilized. However, other than significant amounts of time and investment going by, cryptocurrency systems have no way to self-stabilize fluctuation. As will be appreciated, if the cryptocurrency fluctuates widely in value it is not possible to use it as cash. Hence, controlling price fluctuations is critical to implementing a useable electronic cryptocurrency system.

The example embodiments provide for a self-stabilizing blockchain network. Some of the benefits of such a solution include that ability of the blockchain network to self-stabilize volatility within a cryptocurrency through manipulation of content of data blocks stored on the blockchain. Mining nodes which are traditionally tasked with mining new units of cryptocurrency and adding transactions to the distributed ledger can manipulate block content stored on the distributed ledger when a volatility measure exceeds a predetermined threshold. The mining nodes may store empty data blocks (i.e., transaction-free data blocks) that include mining information such as mining rewards and answers to crypto puzzles, but which do not include transactions. In doing so, the mining node prevents transactions from being stored on the distributed ledger which provides time for a value of the cryptocurrency to stabilize.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. Cryptocurrencies are inherent to blockchain (or some other form of distributed ledger). Cryptocurrencies cannot rely on a single trusted authority because they implement a distributed and decentralized scheme. Therefore, it is difficult to implement a solution in which volatility can be stabilized.

According to various aspects, consensus among mining nodes and other members of the blockchain network may be used to determine which oracles to trust with volatility information and also used to determine a volatility threshold at which point transactions are suspended. Furthermore, because blockchain is a distributed system, there is no easy way to measure time in such a system. An alternative to time is a number or measure of blocks stored on the blockchain. Therefore, instead of implementing a timer which is difficult to control among a distributed and decentralized network, the example embodiments implement a block counter such that no transactions are getting processed for a certain predetermined number of blocks. Instead, mining nodes store empty blocks on the blockchain. The generation and storage of empty blocks based on volatility information provided from one or more oracles to a blockchain network, provide a technical solution to a problem of cryptocurrency fluctuation.

Meanwhile, a traditional database could not be used to implement the example embodiments because a traditional database is not used to manage cryptocurrencies which instead rely on a distributed decentralized system rather than a centralized traditional database system. Accordingly, the example embodiments provide for a specific solution to a problem in the arts/field of database storage that is not possible with traditional databases.

As described herein, a blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser node, and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.) efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application in one embodiment relates to a blockchain network, and in another embodiment relates to controlling volatility via blockchain.

FIG. 1 illustrates a blockchain network 100 for controlling volatility of a cryptocurrency, according to example embodiments. Referring to FIG. 1, the blockchain network 100 includes mining nodes 111-114 and oracle systems 131-132 which are connected to each other via a network 120. In this example, the mining nodes 111-114 may mine for units of cryptocurrency (e.g., coins, tokens, units, etc.) and store the cryptocurrency and transactions via a blockchain that is replicated across the mining nodes 111-114. The mining nodes 111-114 may be incentivized for mining cryptocurrency and storing transactions, but it should be appreciated that other blockchain nodes (e.g., non-incentivized peers, orderer, endorser, etc.) may be included within the blockchain network 100. The mining nodes 111-114 may be blockchain peer nodes with the ability to record transactions via a distributed ledger (also referred to as a blockchain ledger). Meanwhile, the oracle systems 131 and 132 may be part of the blockchain or they may be disposed off-chain from the blockchain (i.e., not able to access the blockchain ledger) and may communicate with the mining nodes 111-114 through other channels of communication.

The mining by the mining nodes 111-114 is the mechanism which allows the cryptocurrency to be released and recorded in a secure and decentralized manner without a central authority. The mining process may verify transactions submitted to the blockchain network 100 from client nodes (e.g., user devices, servers, databases, software applications, etc.) and store the transactions to the distributed ledger via blocks in the blockchain. In addition, new units of the cryptocurrency may be released through the mining process. For example, the mining process may include compiling recent transactions into blocks and trying to solve a computationally difficult puzzle. Any computing system with network access and processing capabilities can be used as a mining node 111-114. In operation, each of the mining nodes 111-114 may attempt to solve the puzzle while a first or "winning" mining node that solves the puzzle gets to place the next block on the block chain and claim the block rewards associated with the cryptocurrency. The rewards, which incentivize the mining, may include one or more of the transaction fees associated with the transactions compiled in the block and a newly released unit/coin of the cryptocurrency.

The mining nodes 111-114 may validate new transactions and record them on the distributed ledger. As a non-limiting example, a block (the structure containing transactions) may be mined periodically (e.g., every 10-15 minutes) releasing value of the cryptocurrency to the mining node. The mining nodes 111-114 may compete to solve difficult mathematical problems based on a cryptographic hash algorithm. The solution that is determined may be referred to as a proof-of-work. This proof proves that the mining node consumed/spent significant time and resources to solve the problem. When a block is 'solved', the transactions contained are considered confirmed, and a unit of cryptocurrency concerned in the transactions can be spent. In addition to a unit of the cryptocurrency being released to the mining node that solves the problem, mining nodes may also receive transactions fees.

The blockchain network 100 may include any number of cryptocurrency exchanges that perform the role of oracle systems (e.g., oracle systems 131-132) and provide information about a cryptocurrency's dollar value (or other fiat currency value). For example, the oracle systems 131-132 may periodically transmit information to the mining nodes 111-114 providing information about trading values of the cryptocurrency with respect to one or more fiat currencies. The network 100 may be a peer-to-peer network. Also, the number of each type of entity can change at any time. IP addresses of oracle systems 131-132 and mining nodes 111-114 may be known to each other and enable communication. For example, channels may be established between one or more oracle systems 131-132 and one or more mining nodes 111-114 and cryptocurrency information identifying fluctuation in value of the cryptocurrency may be provided on a periodic basis, randomly, conditionally, and the like.

When a mining node (e.g., any of mining nodes 111-114) determines that a volatility threshold has been broken or otherwise reached, the mining node may stop storing transactions being acquired from a client transaction pool and may store one or more transaction-free blocks within the blockchain. The transaction-free blocks may include hash pointer information to a previous block (which may include transactions) as well as mined information generated by the mining node while solving a puzzle. However, the transaction-free blocks may not include any transaction data and may be empty or otherwise null. Therefore, the transactions can be suspended from being stored on the blockchain until a volatility level of the cryptocurrency is restored. Furthermore, timing is difficult to implement with a blockchain because transactions are stored in batch and by many possible nodes. Therefore, implementing a timer is difficult. In order to overcome this, the example embodiments may use a counter that is configured to set a particular number of transaction-less data blocks which are stored on the blockchain before resuming the storage of transaction data blocks.

Figure 2A:
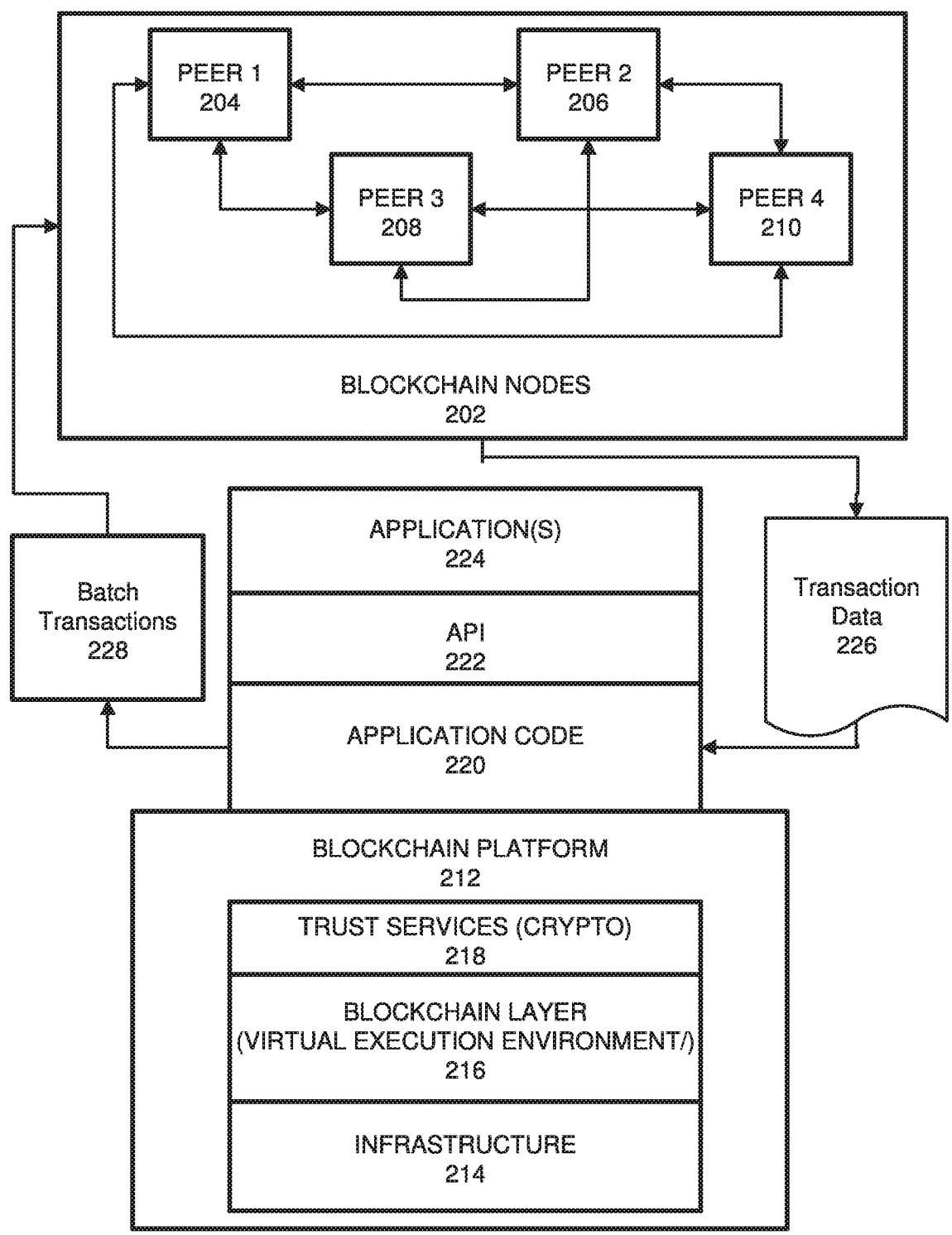
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, transaction information 226 may be processed by one or more processing entities (e.g., virtual machines) included in the blockchain layer 216. The transaction batch result 228 may include a batch of transactions of the blockchain. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
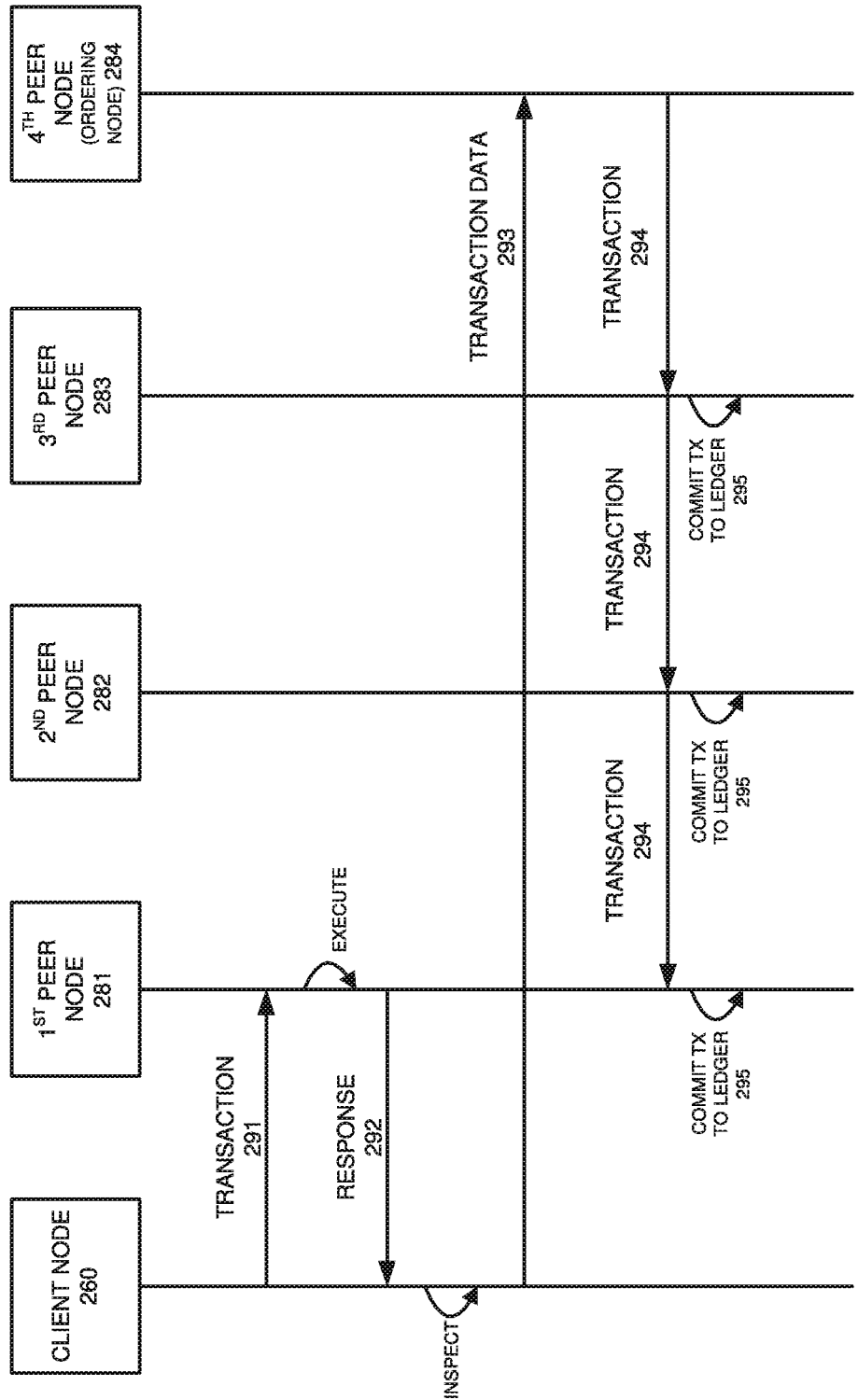
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
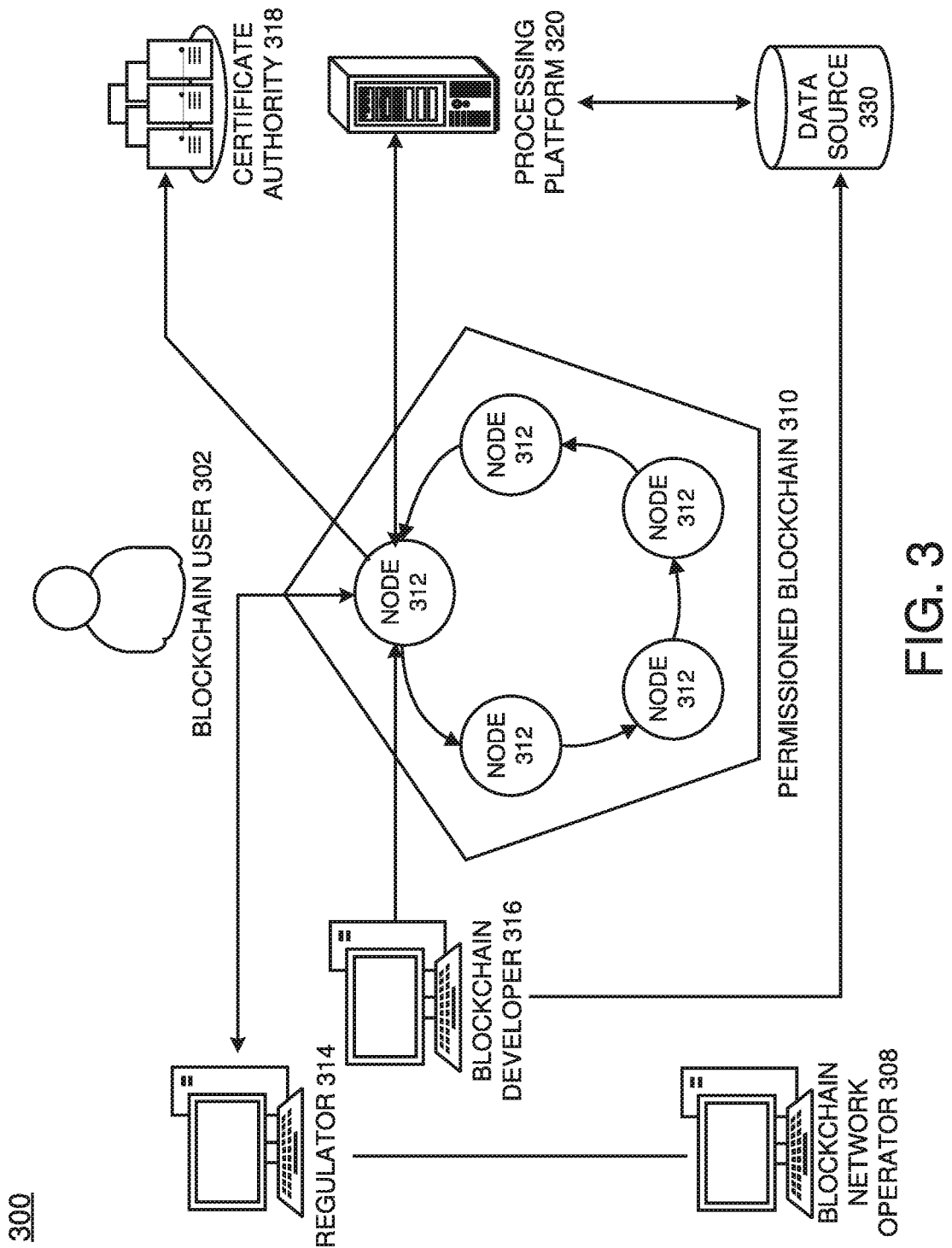
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
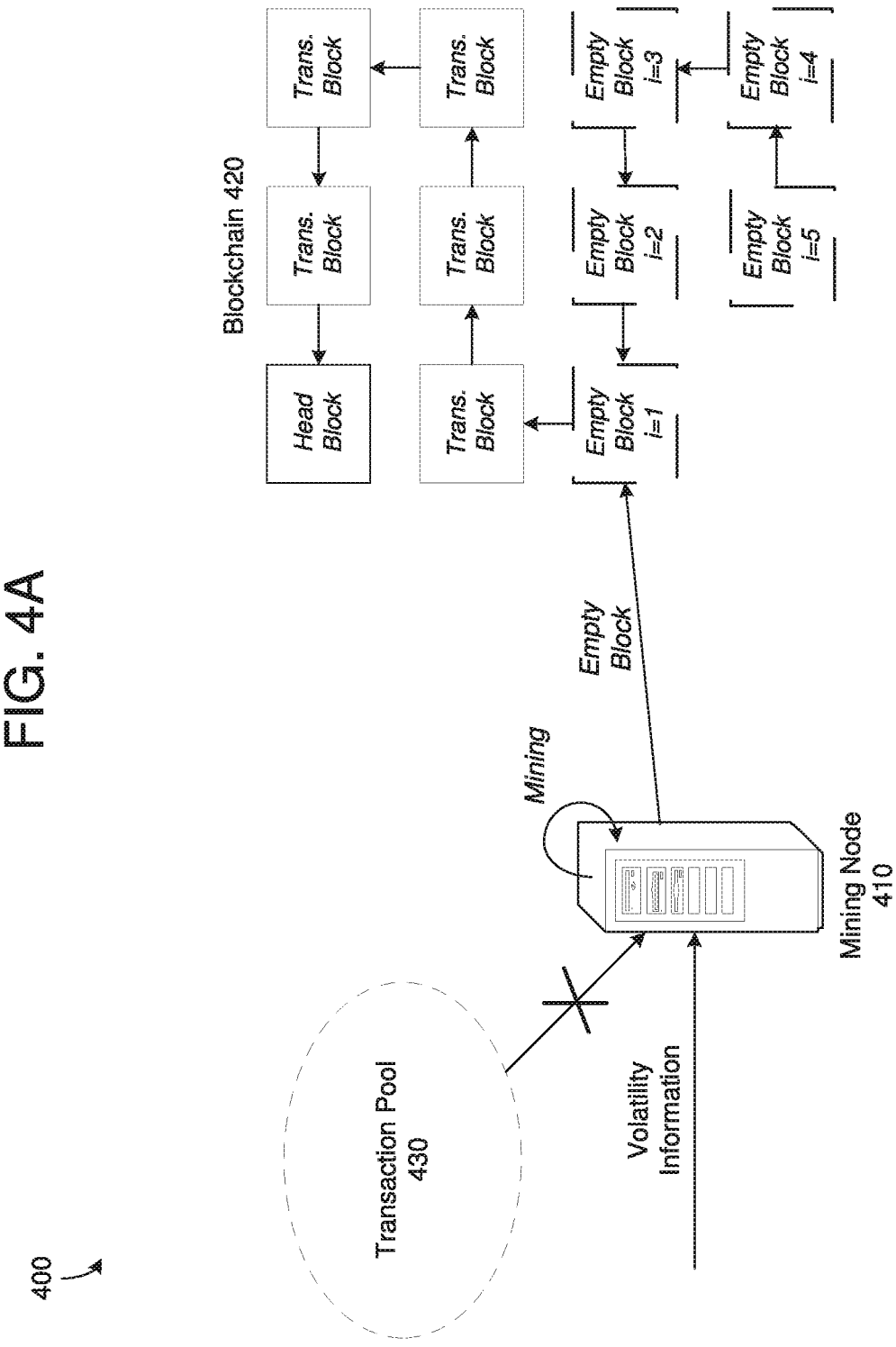
FIG. 4A is a diagram illustrating a process of controlling volatility of a cryptocurrency according to example embodiments.

FIG. 4A illustrates a process 400 of controlling volatility of a cryptocurrency according to example embodiments. For example, the process 400 may be performed by a mining node 410 such as one of the mining nodes 111-114 shown in FIG. 1, although the process 400 is not limited to being performed by a mining node but may be performed by any type of blockchain node (e.g., peer, endorser, orderer, etc.) Also, it should be appreciated that a mining node may be any kind of blockchain peer node implementing any known blockchain node roles. Referring to FIG. 4A, the mining node 410 receives transactions from a pool of transactions 430 submitted by client nodes for storage on a blockchain 420. The mining node 410 may also mine for units of cryptocurrency.

In operation, the mining node 410 may verify transactions from the transaction pool 430 while solving a mining puzzle associated with the cryptocurrency and provided from the blockchain 420. In response to solving the mining puzzle, the mining node 410 may submit both the solution to the mining puzzle and verified transactions to the blockchain 420 as a transaction data block 450 shown in FIG. 4B. The transaction data block 450 may include a plurality of verified transactions (e.g., 10, 100, 500, 1000, etc.) which are recorded within the transaction data block 450 and stored among a hash-link chain of blocks on the blockchain 420. Transaction data blocks 450 may also include pointer information identifying a previous block in the hash-linked chain of blocks, puzzle solution information, block reward information, and the like.

According to various embodiments, the mining node 410 may also receive volatility information from a trusted source such as an oracle system (e.g., oracle systems 131-132 shown in FIG. 1). The volatility information may include information about a fluctuation in a value of a cryptocurrency mined by the mining node 410. In response to the mining node 410 determining that a volatility of the cryptocurrency has reached a predetermined threshold, the mining node 410 may take technical steps to reduce or otherwise stop fluctuation in the cryptocurrency. For example, the mining node 410 may stop recording transactions from the transaction pool 430 and generate and store one or empty data blocks within the hash-link chain of blocks on the blockchain 420. An empty data block may include a transaction-free data block 460 as shown in FIG. 4B. As a non-limiting example, the transaction-free data block 460 may include pointer information to a previous block in the hash-linked chain of blocks on the blockchain 420, mining information such as block reward information, a solution to a puzzle, and the like. However, the transaction-free data block 460 does not include any recorded transactions. In other words, the transaction storage area of the transaction-free data block may be empty.

Furthermore, the mining node 410 may implement an incremental counter (i.e., i=N) which can be shared with other mining nodes and can be used to set a number of transaction-free data blocks 460 to record on the blockchain before resuming transaction recordation. For example, the incremental counter may be set to an amount based on a level of volatility. Here, if the volatility is high, the counter may be dynamically set to a higher number, while if the volatility is low, the counter may be dynamically set to a lower number. In the example of FIG. 4A, the incremental counter is set to 5. Therefore, the mining node 410 will submit a transaction-free data block until the blockchain 420 includes five transaction-free data blocks in a row. Here, the transaction-free data blocks may be accumulated by multiple mining nodes sharing a common blockchain. When the counter has reached its last count, the mining node 410 may resume submitting transaction data blocks while continuing to monitor the volatility. The process may be iteratively repeated each time volatility spikes within the cryptocurrency.

FIG. 5 illustrates a method 500 of controlling volatility of a cryptocurrency via a blockchain, according to example embodiments. For example, the method 500 may be performed by a blockchain node such as a miner or mining node. As another example, the method 500 may be performed by a plurality of devices and/or systems. Referring to FIG. 5, in 510, the method may include receiving cryptocurrency information of a cryptocurrency mined via a blockchain. For example, the cryptocurrency information may be received from one or more oracle nodes or systems previously agreed upon by consensus of a plurality of mining nodes within the blockchain network. The oracle nodes may be located off-chain in that they are not able to view the blockchain records, but instead are off-chain sources of data. As another example, the oracle nodes could be on-chain and have access to the blockchain records. The cryptocurrency information may include current exchange ratio information of the cryptocurrency with respect to one or more fiat currencies.

In 520, the method may include determining a volatility of the cryptocurrency based on the received cryptocurrency information. For example, the cryptocurrency information may be used to determine whether a value of the cryptocurrency is fluctuating (e.g., dropping, rising, etc.) above a threshold amount within a threshold amount of time. The volatility may be based on the exchange ratio information or some other fiat currency values that are more stable than a cryptocurrency.

In response to the determined volatility being greater than a predetermined threshold, in 530 the method may include stopping inclusion of transaction data within data blocks for storage on the blockchain and generating one or more transaction-free data blocks. Furthermore, in 540 the method may include storing the one or more transaction-free data blocks within a hash-linked chain of transaction data blocks previously stored on the blockchain. For example, a transaction-free data block may include a hash of block content of a previous data block on the blockchain and an empty transaction storage area.

Although not shown in FIG. 5, in some embodiments the method may further include mining for new tokens of the cryptocurrency and storing mined information within a transaction-free data block from among the one or more transaction-free data blocks. For example, the mined information stored in the transaction-free data block may include a solution to a computational puzzle solved by the mining node, a block reward associated with the puzzle, a timestamp, and the like.

In some embodiments, the stopping of the inclusion of transaction data and the generating of transaction-free data blocks may be performed until a predetermined number of transaction-free data blocks are generated and stored on the blockchain. In this example, the blockchain network may implement a counter that increments each time a transaction-free data block is stored up until the transaction counter reaches a predetermined threshold. The counter may be shared among the mining nodes of the blockchain network such that each node may be based off of a common counter. In some embodiments, the method may further include resuming the inclusion of transaction data within data blocks for storage on the blockchain and storing the transaction data blocks within the hash-linked chain including transaction-free data blocks. For example, when the incremental counter reaches a threshold, the mining nodes may resume storing transactions from a transaction pool while the volatility continues to be monitored for fluctuations.

Figure 6A:
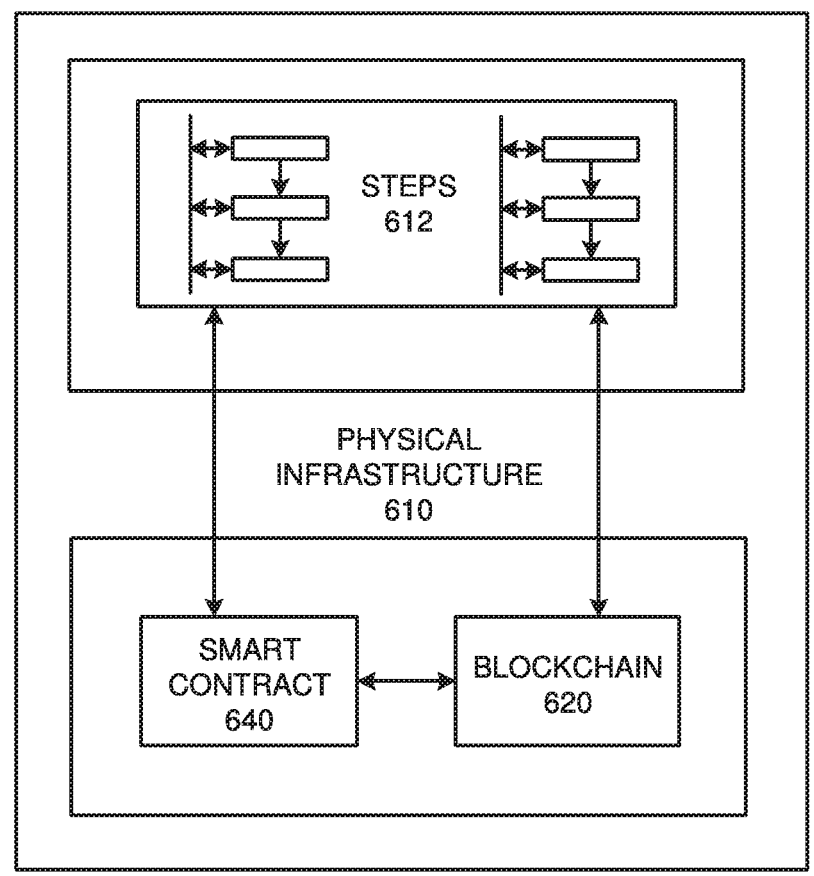
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
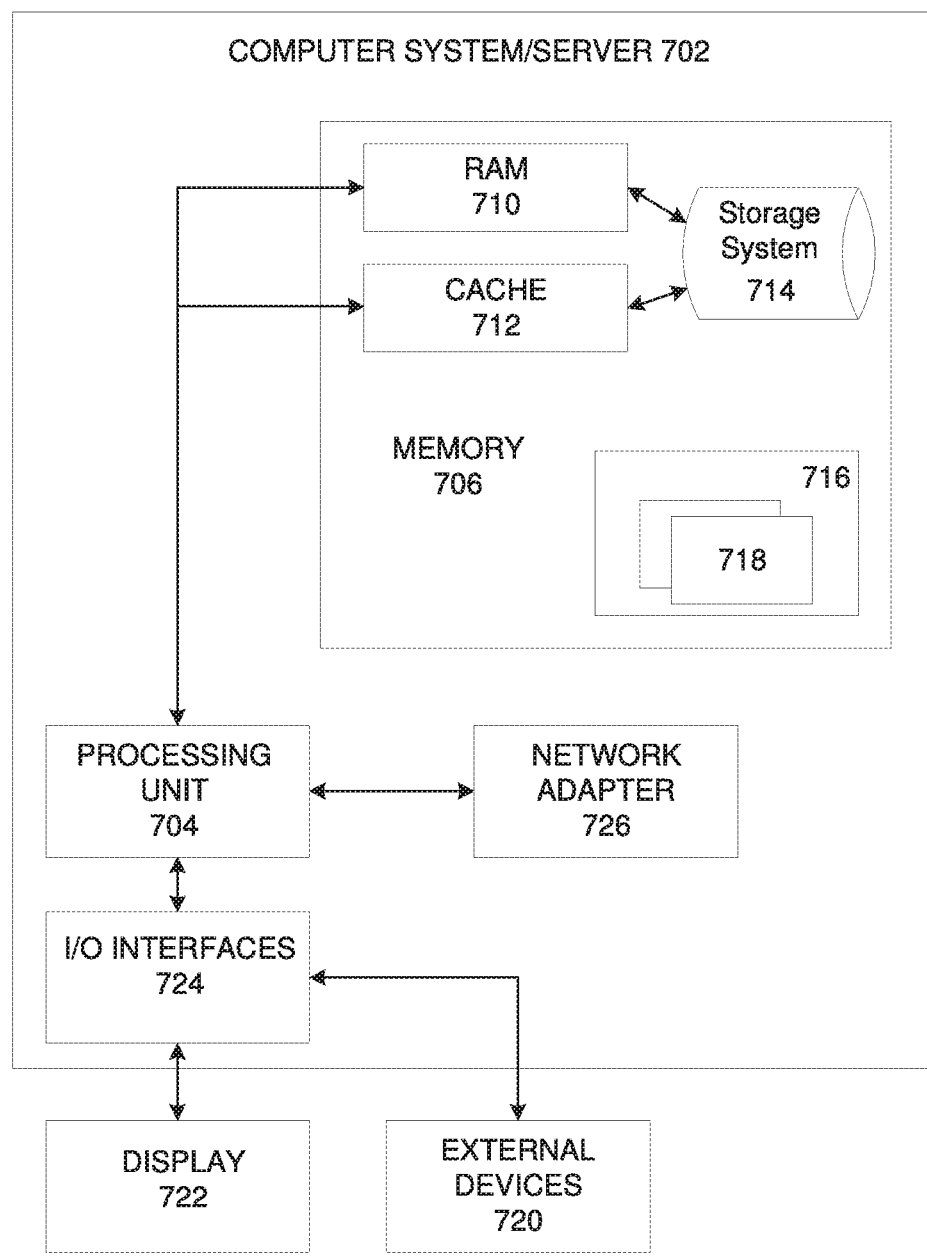
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the network interface 726 may receive cryptocurrency information of a cryptocurrency mined via a blockchain. For example, the cryptocurrency information may include exchange ratio information with respect to one or more fiat currencies, and the like. The processor 704 may determine a volatility of the cryptocurrency based on the received cryptocurrency information, and, when the volatility is determined to be greater than a predetermined threshold, stop inclusion of transaction data within data blocks for storage on the blockchain and generate one or more transaction-free data blocks. Furthermore, the storage (memory 706) may store the one or more transaction-free data blocks within a hash-linked chain of transaction data blocks previously stored on the blockchain.

The transaction-free data block generated by the processor 704 may include a hash of block content of a previous data block on the blockchain and an empty transaction storage area. In other words, the transaction-free data block may be empty with respect to transactions but still include information about previous blocks on the blockchain thus enabling the hash-link to be maintained. In some embodiments, the processor 704 may further mine for new tokens or other units of the cryptocurrency and store mined information within a transaction-free data block from among the one or more transaction-free data blocks stored on the blockchain. Here, the mined information stored in the blockchain within a transaction-free block may include solution information of a computational puzzle and a block reward.

In some embodiments, the processor 704 may stop the inclusion of transaction data and the generate transaction-free data blocks until a predetermined number of transaction-free data blocks are generated and stored on the blockchain. Here, the processor 704 may implement a counter that is incremented each time a transaction-free data block is stored by one of the mining nodes in the blockchain network. In some embodiments, the processor 704 may resume the inclusion of transaction data within data blocks for storage on the blockchain and store the transaction data blocks within the hash-linked chain including transaction-free data blocks.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a network interface configured to receive cryptocurrency information of a cryptocurrency mined via a blockchain;
   a processor configured to determine a volatility of the cryptocurrency based on the received cryptocurrency information, and, when the volatility is determined to be greater than a predetermined threshold, stop inclusion of transaction data within data blocks for storage on the blockchain and generate one or more transaction-free data blocks; and
   a storage configured to store the one or more transaction-free data blocks within a hash-linked chain of transaction data blocks previously stored on the blockchain.

2. The computing system of claim 1, wherein each generated transaction-free data block comprises a hash of block content of a previous data block on the blockchain and an empty transaction storage area.

3. The computing system of claim 1, wherein the processor is further configured to mine for new tokens of the cryptocurrency and store mined information within a transaction-free data block from among the one or more transaction-free data blocks.

4. The computing system of claim 3, wherein the mined information comprises solution information of a computational puzzle and a block reward.

5. The computing system of claim 1, wherein the processor is configured to stop the inclusion of transaction data and the generate transaction-free data blocks until a predetermined number of transaction-free data blocks are generated and stored on the blockchain.

6. The computing system of claim 1, wherein the processor is further configured to resume the inclusion of transaction data within data blocks for storage on the blockchain and store the transaction data blocks within the hash-linked chain that include transaction-free data blocks.

7. The computing system of claim 1, wherein the received cryptocurrency information is received from a plurality of oracle nodes agreed upon through consensus of a plurality of blockchain nodes.

8. The computing system of claim 1, wherein the received cryptocurrency information comprises exchange ratio information of the cryptocurrency with respect to one or more fiat currencies.

9. A method comprising:
   receiving cryptocurrency information of a cryptocurrency mined via a blockchain;
   determining a volatility of the cryptocurrency based on the received cryptocurrency information;
   in response to the determined volatility being greater than a predetermined threshold, stopping inclusion of transaction data within data blocks for storage on the blockchain, and generating one or more transaction-free data blocks; and
   storing the one or more transaction-free data blocks within a hash-linked chain of transaction data blocks previously stored on the blockchain.

10. The method of claim 9, wherein each generated transaction-free data block comprises a hash of block content of a previous data block on the blockchain and an empty transaction storage area.

11. The method of claim 9, further comprising mining for new tokens of the cryptocurrency and storing mined information within a transaction-free data block from among the one or more transaction-free data blocks.

12. The method of claim 11, wherein the mined information comprises solution information of a computational puzzle and a block reward.

13. The method of claim 9, wherein the stopping of the inclusion of transaction data and the generating of transaction-free data blocks is performed until a predetermined number of transaction-free data blocks are generated and stored on the blockchain.

14. The method of claim 9, further comprising resuming the inclusion of transaction data within data blocks for storage on the blockchain and storing the transaction data blocks within the hash-linked chain including transaction-free data blocks.

15. The method of claim 9, wherein the cryptocurrency information is received from a plurality of oracle nodes agreed upon through consensus of a plurality of blockchain nodes.

16. The method of claim 9, wherein the cryptocurrency information comprises exchange ratio information of the cryptocurrency with respect to one or more fiat currencies.

17. A non-transitory computer readable medium comprising instructions, that when read by a processor, cause the processor to perform:
   receiving cryptocurrency information of a cryptocurrency mined via a blockchain;
   determining a volatility of the cryptocurrency based on the received cryptocurrency information;
   in response to the determined volatility being greater than a predetermined threshold, stopping inclusion of transaction data within data blocks for storage on the blockchain, and generating one or more transaction-free data blocks; and
   storing the one or more transaction-free data blocks within a hash-linked chain of transaction data blocks previously stored on the blockchain.

18. The non-transitory computer readable medium of claim 17, wherein each generated transaction-free data block comprises a hash of block content of a previous data block on the blockchain and an empty transaction storage area.

19. The non-transitory computer readable medium of claim 17, wherein the instructions are further configured to cause the processor to perform mining for new tokens of the cryptocurrency and storing mined information within a transaction-free data block from among the one or more transaction-free data blocks.

20. The non-transitory computer readable medium of claim 17, wherein the stopping of the inclusion of transaction data and the generating of transaction-free data blocks is performed until a predetermined number of transaction-free data blocks are generated and stored on the blockchain.

\* \* \* \* \*